United States Patent
Jooste et al.

(10) Patent No.: US 9,516,006 B2
(45) Date of Patent: Dec. 6, 2016

(54) RE-PROGRAMMABLE SECURE CRYPTOGRAPHIC DEVICE

(71) Applicant: GOOGLE INC., Mountain View, CA (US)

(72) Inventors: Sarel Kobus Jooste, Novato, CA (US); Shane Farmer, San Francisco, CA (US); Ismail Cem Paya, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 180 days.

(21) Appl. No.: 14/061,727

(22) Filed: Oct. 23, 2013

(65) Prior Publication Data

US 2015/0113271 A1 Apr. 23, 2015

(51) Int. Cl.
*H04L 29/06* (2006.01)
*H04W 4/00* (2009.01)
*H04W 12/02* (2009.01)
*H04W 12/06* (2009.01)

(52) U.S. Cl.
CPC ............ *H04L 63/08* (2013.01); *H04W 4/008* (2013.01); *H04W 12/02* (2013.01); *H04W 12/06* (2013.01); *H04L 63/0492* (2013.01)

(58) Field of Classification Search
CPC ..................................... H04L 63/08
USPC ........................................ 713/168
See application file for complete search history.

(56) References Cited

U.S. PATENT DOCUMENTS

| | | | | |
|---|---|---|---|---|
| 4,837,822 A * | 6/1989 | Crosley | ............... | G07C 9/00015 380/30 |
| 5,540,069 A * | 7/1996 | Muller | ............... | G07C 9/00904 340/5.65 |
| 5,602,535 A * | 2/1997 | Boyles | ............... | B60R 25/24 307/10.1 |
| 5,986,564 A * | 11/1999 | Fraser | ............... | G07C 9/00722 340/5.6 |

(Continued)

OTHER PUBLICATIONS

U.S. Appl. No. 13/830,930 to Aiello et al. filed Mar. 14, 2013.
(Continued)

*Primary Examiner* — Hadi Armouche
*Assistant Examiner* — Shahriar Zarrineh
(74) *Attorney, Agent, or Firm* — Johnson, Marcou & Isaacs, LLC

(57) ABSTRACT

A re-programmable wireless cryptographic device can store data securely and use near field communication (NFC) to exchange functionality data and/or program code from a central server system through a mobile device. A user requests a new cryptographic device or a new device function via an application on the mobile device. The central server system transmits program code and a public key used to identify the cryptographic device to the mobile device, which functions as a pass-through conduit for the information, storing it until the devices are synced. A NFC communication channel is created, and the mobile device authenticates the cryptographic device by cross-referencing the public key received from the central server system with the public key transmitted by the cryptographic device once the communication channel is established. Upon authentication, the cryptographic device is synced with the mobile device, and the mobile device passes the program code to the cryptographic device.

20 Claims, 8 Drawing Sheets

(56) References Cited

U.S. PATENT DOCUMENTS

| | | | | |
|---|---|---|---|---|
| 6,138,059 | A * | 10/2000 | Ozeki | G11C 5/14 701/1 |
| 6,477,559 | B1 * | 11/2002 | Veluvali | H04L 63/08 379/265.01 |
| 7,953,216 | B2 | 5/2011 | Profanchik, Sr. | |
| 8,639,291 | B1 | 1/2014 | Gailloux et al. | |
| 2003/0005289 | A1 * | 1/2003 | Gougeon | G06Q 20/341 713/156 |
| 2003/0097522 | A1 * | 5/2003 | Lay | G06F 8/60 711/103 |
| 2004/0215958 | A1 * | 10/2004 | Ellis | H04L 63/08 713/155 |
| 2004/0233065 | A1 * | 11/2004 | Freeman | G06K 7/10079 340/8.1 |
| 2005/0164748 | A1 | 7/2005 | Kitaji et al. | |
| 2007/0118745 | A1 * | 5/2007 | Buer | 713/168 |
| 2007/0118891 | A1 * | 5/2007 | Buer | G06F 21/34 726/8 |
| 2008/0122594 | A1 * | 5/2008 | Brecht | B60R 25/24 340/426.11 |
| 2008/0148083 | A1 | 6/2008 | Pesavento et al. | |
| 2008/0155257 | A1 | 6/2008 | Werner et al. | |
| 2009/0033485 | A1 * | 2/2009 | Naeve | H04W 8/005 340/539.23 |
| 2009/0200371 | A1 * | 8/2009 | Kean et al. | 235/379 |
| 2009/0252080 | A1 * | 10/2009 | Kim | H04B 7/155 370/315 |
| 2010/0029202 | A1 | 2/2010 | Jolivet et al. | |
| 2010/0207742 | A1 * | 8/2010 | Buhot | H04B 5/06 340/10.51 |
| 2011/0191252 | A1 * | 8/2011 | Dai | 705/71 |
| 2012/0052800 | A1 | 3/2012 | Bona et al. | |
| 2013/0019162 | A1 * | 1/2013 | Smaltz | G06F 21/125 715/234 |
| 2013/0075469 | A1 | 3/2013 | Stochita | |
| 2013/0086658 | A1 * | 4/2013 | Kottahachchi et al. | 726/6 |
| 2013/0196645 | A1 * | 8/2013 | Morelli et al. | 455/418 |
| 2013/0212661 | A1 * | 8/2013 | Neafsey et al. | 726/6 |
| 2013/0249709 | A1 | 9/2013 | Ellis et al. | |
| 2013/0318592 | A1 * | 11/2013 | Grier, Sr. | H04L 9/3234 726/9 |
| 2014/0049363 | A1 * | 2/2014 | Ahearn et al. | 340/5.51 |
| 2014/0051425 | A1 * | 2/2014 | Ahearn et al. | 455/420 |
| 2014/0240086 | A1 * | 8/2014 | Van Wiemeersch | 340/5.51 |
| 2014/0282993 | A1 * | 9/2014 | Van Till | H04L 63/08 726/9 |
| 2015/0134536 | A1 * | 5/2015 | Li | G06Q 20/32 705/66 |

OTHER PUBLICATIONS

Echo Product Release Update—Protean Payment Platform, pp. 1-5, Jan. 1, 2012.

Echo Protean—Fuse All of Your Cards Into One—TechCrunch, pp. 1-4, Jan. 1, 2012.

Wilder, "Office Action issued in copending U.S. Appl. No. 13/830,930, filed Mar. 14, 2013", Jan. 8, 2015, 1-14.

Yang, "International Search Report and Written Opinion issued in International Application PCT/US2014/060784", Jan. 15, 2015, 1-11.

Wilder, "Office Action issued in copending U.S. Appl. No. 13/830,930, filed Mar. 14, 2013", Jun. 11, 2015, 1-23.

Moon, "Korean Office Action issued in Korean Application No. 10-2016-7013638", mailed on Jun. 29, 2016, 3 pages of English Translation and 3 pages of Korean Office Action.

* cited by examiner

390

410 User accesses account management system application on mobile device

420 User device moved within predefined proximity of mobile device

430 Mobile device and user device establish communication channel

440 User device authenticated

450 Mobile device retrieves program code

460 Mobile device transmits program code to user device

470 User device receives program code

480 User device formatted

490 User device transmits successful formatting message to mobile device

495 Mobile device receives successful formatting message ( 395, Fig. 3 )

```
710
┌─────────────────────────────────────────────────────────────┐
│ User device moved within predefined proximity of mobile device │
└─────────────────────────────────────────────────────────────┘
                              │
720                           ▼
┌─────────────────────────────────────────────────────────────┐
│ Mobile device and user device establish communication channel │
└─────────────────────────────────────────────────────────────┘
                              │
440                           ▼
┌─────────────────────────────────────────────────────────────┐
│                    User device authenticated                 │
└─────────────────────────────────────────────────────────────┘
                              │
745                           ▼
┌─────────────────────────────────────────────────────────────┐
│               Mobile device retrieves programming code        │
└─────────────────────────────────────────────────────────────┘
                              │
750                           ▼
┌─────────────────────────────────────────────────────────────┐
│         Mobile device transmits programming code to user device │
└─────────────────────────────────────────────────────────────┘
                              │
760                           ▼
┌─────────────────────────────────────────────────────────────┐
│                User device receives programming code          │
└─────────────────────────────────────────────────────────────┘
                              │
770                           ▼
┌─────────────────────────────────────────────────────────────┐
│                       User device formatted                   │
└─────────────────────────────────────────────────────────────┘
                              │
780                           ▼
┌─────────────────────────────────────────────────────────────┐
│  User device transmits successful formatting message to mobile device │
└─────────────────────────────────────────────────────────────┘
                              │
790                           ▼
┌─────────────────────────────────────────────────────────────┐
│         Mobile device receives successful formatting message  │
└─────────────────────────────────────────────────────────────┘
                              │
                              ▼
                          ( 695,
                           Fig. 6 )
```

Figure 7

RE-PROGRAMMABLE SECURE CRYPTOGRAPHIC DEVICE

TECHNICAL FIELD

The present disclosure relates generally to cryptographic devices, and more particularly to methods and systems that allow users to re-program wireless cryptographic devices that can store data securely and use radio frequency (RF) communication to exchange functionality data.

BACKGROUND

Wireless device technology incorporates proximity communications between two devices to authenticate and enable the transfer of data (for example, payment information) over the air or without physical connection. Near Field Communication (NFC) is an example of a proximity communication option that can enable wireless device communications and that is supported by the Global System for Mobile Communications (GSM) Association. NFC communication distances generally range from about 3 to about 4 inches. Such short communication distances enable secure communication between close field proximity enabled devices.

In GSM phones, a proximity-enabled controller (for example, an NFC controller) with an antenna is incorporated into the wireless device with the secure contactless software applications located on a smart chip. An NFC-enabled wireless device enables the transfer of data information to a reader device to enable financial transactions, ticketing, secure authentication, coupons, and other transaction for the device owner.

SUMMARY

In certain example aspects described herein, a method for providing a re-programmable wireless cryptographic device comprises a re-programmable wireless cryptographic device that can store data securely and use near field communication (NFC) to exchange functionality data and/or program code from a central server system, high security module cloud system, or other third party system through a portable communication device (for example, a user's mobile phone). The user accesses an account management system application on a mobile device and requests a new user device via the account management system application on the mobile device. The mobile device transmits the request to the account management system. The account management system transmits program code and an identifier used to identify the user device to the mobile device, which functions as a pass-through conduit for the information, storing the information until the user device syncs with the mobile device. The user device is brought within a predefined proximity of the mobile device or otherwise "tapped" with the mobile device, and an NFC communication channel or other form of proximity based wireless communication channel is created. The mobile device authenticates the user device by cross-referencing the identifier received from the account management system with the identifier transmitted by the user device once the communication channel is established. Upon authentication, the user device is synced with the mobile device and the mobile device passes the program code to the user device.

The user submits a request for a new user device function via the account management system application on the mobile device. The mobile device transmits the request to the account management system, and the account management system authenticates the user device. Upon authentication, the account management system transmits program code for the desired functionality to the mobile device. The mobile device saves the program code until it syncs with the user device. Upon syncing with the user device, the program code is transmitted to the user device via a wireless communication channel.

These and other aspects, objects, features, and advantages of the example embodiments will become apparent to those having ordinary skill in the art upon consideration of the following detailed description of illustrated example embodiments.

BRIEF DESCRIPTION OF THE DRAWINGS

FIG. 4 is a block flow diagram depicting a method for synching a new re-programmable wireless cryptographic user device with a mobile device, in accordance with certain example embodiments.

FIG. 7 is a block flow diagram depicting a method for synching a re-programmable wireless cryptographic user device with a mobile device to add a new function to the re-programmable wireless cryptographic device, in accordance with certain example embodiments.

DETAILED DESCRIPTION OF THE EXAMPLE EMBODIMENTS

Overview

Figure 1:
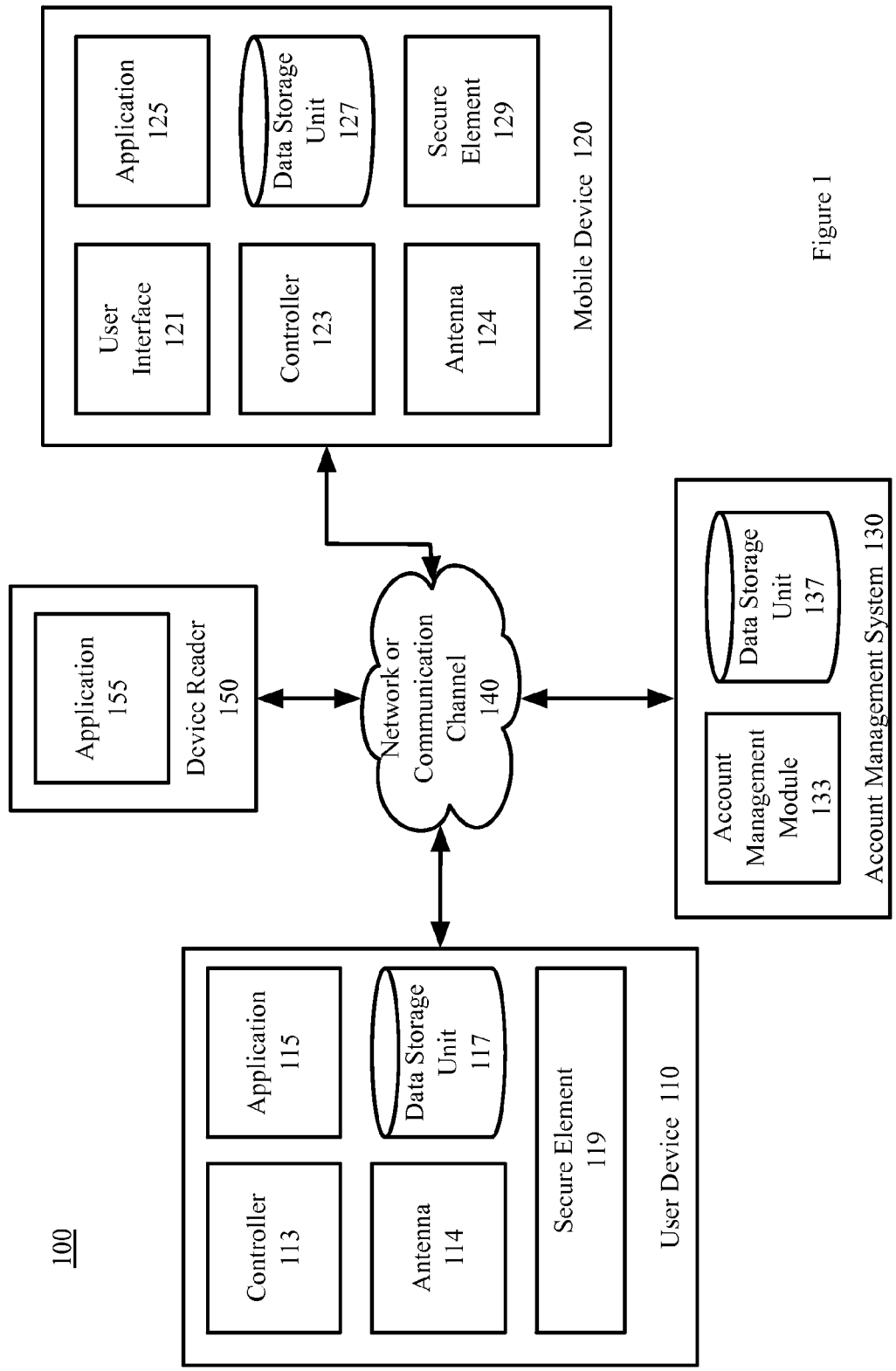
FIG. 1 is a block diagram depicting a re-programmable wireless cryptographic device system, in accordance with certain example embodiments.

The example embodiments described herein provide computer-implemented techniques for providing a re-programmable wireless cryptographic device that can store data securely and use near field communication (NFC) to exchange functionality data. In an example embodiment, the re-programmable wireless cryptographic device is a smart card, wristband or bracelet, key fob, or other wireless token or device that does not comprise an operating system, an application host processor, an internal power source, or a user interface. In an example embodiment, the re-programmable wireless cryptographic device receives program code from a central server system, high security module cloud system, or other third party system through a portable communication device (for example, a user's mobile phone).

For example, the re-programmable wireless cryptographic device may be a bracelet device worn by hospital patients. The bracelet is programmed to include the patient's medical data. Additional functionality may be programmed onto the bracelet to allow the bracelet to function as a door access pass, to track medications given to the patient, and other functionality as required. In another example, the re-programmable wireless cryptographic device is a smart card. The smart card is programmed to include payment information for the user's Issuer A VISA account. The user then adds functionality to the smart card to include payment information for the user's Issuer B MasterCard account and security access for the user's place of business. The smart card retains the functionality of the user's Issuer A VISA account, until the user removes that functionality.

The user accesses an account management system application on a mobile device. In an example embodiment, the account management system maintains an account for the user and comprises programs encoding functionality that may be added to the user's re-programmable wireless cryptographic device. The user requests a new user device via the account management system application on the mobile device, and the mobile device transmits the request to the account management system. In an example embodiment, the user device is the re-programmable wireless cryptographic device. The account management system transmits program code and an identifier used to identify the user device to the mobile device. In an example embodiment, the mobile device does not have access to a private key required to read or otherwise understand the program code. In this embodiment, the mobile device functions as a pass-through conduit for the information, storing the information until the user device syncs with the mobile device.

The user device is brought within a predefined proximity of the mobile device or otherwise "tapped" with the mobile device, and an NFC communication channel or other form of proximity based wireless communication channel is created. The mobile device authenticates the user device by cross-referencing the public key received from the account management system with the identifier transmitted by the user device once the communication channel is established. Upon authentication, the user device is synced with the mobile device and the mobile device passes the program code to the user device. In an example embodiment, the user device comprises the private key and is capable of reading and otherwise understanding the program code. The user device transmits a successful formatting message to the mobile device, and the mobile device displays the message on the user interface. In an example embodiment, the program code is received by and processed in a secure element resident in the user device.

The user submits a request for a new user device function via the account management system application on the mobile device. The mobile device transmits the request to the account management system, and the account management system authenticates the user device. Upon authentication, the account management system transmits program code for the desired functionality to the mobile device. The mobile device saves the program code until it syncs with the user device. Upon syncing with the user device, the program code is transmitted to the user device via a wireless communication channel. In an example embodiment, the user adds or removes additional functionality to the user device by repeating this process.

In an alternative example, the account management system can initiate the change of device function for the user device by communicating the program code for the desired function to the mobile device. The mobile device then communicates the program code for the desired function to the user device when the user device next syncs with the mobile device.

In an example embodiment, the user device transmits use data to the mobile device while the devices are synced. The mobile device transmits the use data to the account management system but is unable to read or otherwise understand the data.

The inventive functionality of the invention will be explained in more detail in the following description, read in conjunction with the figures illustrating the program flow.

Example System Architectures

Turning now to the drawings, in which like numerals indicate like (but not necessarily identical) elements throughout the figures, example embodiments are described in detail.

FIG. 1 is a block diagram depicting a re-programmable wireless cryptographic device system, in accordance with certain example embodiments. As depicted in FIG. 1, the exemplary operating environment 100 comprises a user device 110, a mobile device 120, an account management system 130, and a device reader 150 that are configured to communicate with one another via one or more networks 140. In another example embodiment, two or more of these systems (including systems 110, 120, 130, and 150) are integrated into the same system. In some embodiments, a user associated with a device must install an application and/or make a feature selection to obtain the benefits of the techniques described herein.

Each network 140 includes a wired or wireless telecommunication means by which network systems (including systems 110, 120, 130, and 150) can communicate and exchange data. For example, each network 140 can be implemented as, or may be a part of, a storage area network (SAN), personal area network (PAN), a metropolitan area network (MAN), a local area network (LAN), a wide area network (WAN), a wireless local area network (WLAN), a virtual private network (VPN), an intranet, an Internet, a mobile telephone network, a card network, Bluetooth, near field communication network (NFC), any form of standardized radio frequency, or any combination thereof, or any other appropriate architecture or system that facilitates the communication of signals, data, and/or messages (generally referred to as data). Throughout this specification, it should be understood that the terms "data" and "information" are used interchangeably herein to refer to text, images, audio, video, or any other form of information that can exist in a computer-based environment.

In an example embodiment, each network system (including systems 110, 120, 130, and 150) includes a device having a communication module capable of transmitting and receiving data over the network 140. For example, each network system (including systems 110, 120, 130, and 150) may comprise a server, personal computer, mobile device (for example, notebook computer, tablet computer, netbook computer, personal digital assistant (PDA), video game device, GPS locator device, cellular telephone, Smartphone, or other mobile device), a television with one or more processors embedded therein and/or coupled thereto, or other appropriate technology that includes or is coupled to a web browser or other application for communicating via the network 140.

In an example embodiment, the mobile device 120 may be a personal computer, mobile device (for example, notebook, computer, tablet computer, netbook computer, personal digital assistant (PDA), video game device, GPS locator device, cellular telephone, Smartphone or other mobile device), television, or other appropriate technology that includes or is coupled to a web server, or other suitable application for interacting with web page files. The user can use the mobile device 120 to program, format, and/or re-program the user device 110 via a user interface 121 and an application 125. In an example embodiment, the user communicates with the account management system 130 via the application 125 to obtain program code for the user device 110. In another example embodiment, the user communicates with the user device 110 via the application 125 to format and reprogram the user device 110. The application 125 is a program, function, routine, applet or similar entity that exists on and performs its operations on the mobile device 120. For example, the application 125 may be one or more of a user device 110 application, account management system 130 application, an Internet browser, a digital wallet application, a loyalty card application, another value-added application, a user interface 121 application, or other suitable application operating on the mobile device 120. In some embodiments, the user must install an application 125 and/or make a feature selection on the mobile device 120 to obtain the benefits of the techniques described herein.

In an example embodiment, the mobile device 120 obtains data from the user device 110, stores the data in the data storage unit 127, and transfers the data to the account management system 130. In an example embodiment, the mobile device 120 is unable to understand the data received from the user device 110.

In another example embodiment, the user device 110 receives program code from the account management system, a central server system, high security module cloud system, or other third party system through the mobile device 120. In this embodiment, the mobile device 120 obtains data encoding a functionality for the user device 110 from the account management system 130, stores the data in the data storage unit 127, and writes the data to the user device 110 to provide the user device 110 with additional functionality. In an example embodiment, the mobile device 120 is unable to understand the data received from the account management system 130.

An example mobile device 120 comprises a secure element 129 or secure memory, which can exist within a removable smart chip or a secure digital (SD) card or which can be embedded within a fixed chip on the device 120. In certain example embodiments, Subscriber Identity Module (SIM) cards may be capable of hosting a secure element 129, for example, an NFC SIM Card. The secure element 129 allows a software application 125 resident on the device 120 and accessible by the device user to interact securely with certain functions within the secure element 129, while protecting information stored within the secure element 129. The secure element 129 comprises applications running thereon that may perform the functionality described herein. In an example embodiment, the secure element 129 comprises components typical of a smart card, such as crypto processors and random generators. In an example embodiment, the secure element 129 comprises a NFC controller in a highly secure system on a chip controlled by a smart card operating system, such as a Java Card Platform operating system. In another example embodiment, the secure element 129 is configured to include a non-EMV type contactless smart card, as an optional implementation. The secure element 129 communicates with the application 125 in the mobile device 120. In an example embodiment, the secure element 129 is capable of storing encrypted user information and only allowing trusted applications to access the stored information. In an example embodiment, a controller 123 interacts with a secure key encrypted application 125 for decryption and installation in the secure element 129.

Additionally, the secure element 129 also may comprise secure software applications, such as payment applications, secure forms of the applications 125, authentication applications, payment provisioning applications, user device 110 programming applications, secure data transfer applications, or other suitable application using the secure functionality of the secure element 129.

In an example embodiment, the data storage unit 127 and application 125 may be implemented in the secure element 129 on the mobile device 120. In another example embodiment, the data storage unit 127 may be a separate memory unit resident on the mobile device 120. An example data storage unit 127 enables storage of user contact details for retrieval of a user account management system 130 account and user device 110 program code. In an example embodiment, the data storage unit 127 can include any local or remote data storage structure accessible to the mobile device 120 suitable for storing information. In an example embodiment, the data storage unit 127 stores encrypted information, such as HTML5 local storage.

The mobile device 120 communicates with the user device 110 via an antenna 124. When the mobile device 120 has been activated and prioritized, the controller 123 is notified of the state of readiness of the mobile device 120 for a transaction. The controller 123 polls through the antenna 124 a radio signal, or listens for radio signals from the user device 110.

An example user device 110 is a re-programmable secure cryptographic device, such as a smart card, wristband or bracelet, key fob, or other wireless token or device that does not comprise an operating system, an application host processor, an internal power source, or a user interface.

The user can use the user device 110 to perform a programmed function via an application 115. For example, the user device 110 may be a bracelet device worn by hospital patients. The bracelet is programmed to include the patient's medical data. Additional functionality may be programmed onto the bracelet to allow the bracelet to function as a door access pass, to track medications given to the patient, and other functionality as required. In another example, the user device 110 is a smart card. The smart card is programmed to include payment information for the user's Issuer A VISA account. The user then adds functionality to the smart card to include payment information for the user's Issuer B MasterCard account and security access for the user's place of business. The smart card retains the functionality of the user's Issuer A VISA account, until the user removes that functionality.

An example user device 110 comprises a secure element 119 or secure memory, which can exist within a removable smart chip or a secure digital (SD) card or which can be embedded within a fixed chip on the device 110. In certain example embodiments, Subscriber Identity Module (SIM) cards may be capable of hosting a secure element 119, for example, an NFC SIM Card. The secure element 119 allows a software application 115 resident on the device 110 and accessible by the device user to interact securely with certain functions within the secure element 119, while protecting information stored within the secure element 119. The secure element 119 comprises applications running thereon that may perform the functionality described herein. In an example embodiment, the secure element 119 comprises components typical of a smart card, such as crypto processors and random generators. In an example embodiment, the secure element 119 comprises a NFC controller in a highly secure system on a chip controlled by a smart card operating system, such as a Java Card Platform operating system. In another example embodiment, the secure element 119 is configured to include a non-EMV type contactless smart card, as an optional implementation. The secure element 119 communicates with the application 115 in the user device 110. In an example embodiment, the secure element 119 is capable of storing encrypted user information and only allowing trusted applications to access the stored information. In an example embodiment, a controller 113 interacts with a secure key encrypted application 115 for decryption and installation in the secure element 119.

Additionally, the secure element 119 also may comprise secure software applications, such as payment applications, secure forms of the applications 115, authentication applications, payment provisioning applications, secure data transfer applications, or other suitable application using the secure functionality of the secure element 119.

In an example embodiment, the data storage unit 117 and application 115 may be implemented in the secure element 119 on the user device 110. In another example embodiment, the data storage unit 117 may be a separate memory unit resident on the user device 110. An example data storage unit 117 enables storage of user contact details for retrieval of a user account management system 130 account and/or authentication of the user device 110. In an example embodiment, the data storage unit 117 can include any local or remote data storage structure accessible to the user device 110 suitable for storing information. In an example embodiment, the data storage unit 117 stores encrypted information, such as HTML5 local storage.

The user device 110 communicates with the device reader 150 via an antenna 114. When the user device 110 has been activated and prioritized, the controller 113 is notified of the state of readiness of the user device 110 for a transaction. The controller 113 polls through the antenna 114 a radio signal, or listens for radio signals from the device reader 160.

An example device reader 150 comprises an application 155. A device reader operator can use the device reader 150 to read or retrieve information from the user device 110 via the application 155. The application 155 is a program, function, routine, applet or similar entity that exists on and performs its operations on the device reader 150. For example, the application 155 may be one or more of a user device 110 application, account management system 130 application, a payment application, a ticketing application, an access code application, a data retrieval application, an Internet browser, a digital wallet application, a loyalty card application, another value-added application, or other suitable application operating on the device reader 150. In some embodiments, the device reader operator must install the application 155 and/or make a feature selection on the device reader 150 to obtain the benefits of the techniques described herein.

An example mobile device 120 also communicates with the account management system 130. An example account management system 130 comprises an account management module 133 and a data storage unit 137. In an example embodiment, the user creates an account with the account management system 130. The account management module 133 manages the registration of the user. Regarding user account registration, the account management module 133 may generate web-based user interfaces providing forms for the user to register for an account management system 130 account. For example, the account management module 133 can collect basic user identifying information, registration information on one or more user devices 110, registration information on one or more mobile devices 120, and payment information. In an example embodiment, the user registers one or more financial accounts, including bank account debit cards, credit cards, gift cards, a link to a proxy for one or more financial accounts (for example, a digital wallet link where the digital wallet is connected to other payment accounts), or other type of financial account that can be used to make a purchase, with the account management system 130 using the account management module 133. In an example embodiment, the registered financial payment information may be used to complete a purchase by the user with a merchant system operating the device reader 160. In an example embodiment, the user account information is stored in a user account or is otherwise associated with the user in the data storage unit 137.

In an example embodiment, the data storage unit 137 can include any local or remote data storage structure accessible to the account management system 130 suitable for storing information. In an example embodiment, the data storage unit 137 stores encrypted information, such as HTML5 local storage.

The components of the example-operating environment 100 are described hereinafter with reference to the example methods illustrated in FIGS. 2-7. The example methods of FIGS. 2-7 may also be performed with other systems and in other environments.

Example System Processes

Figure 2:
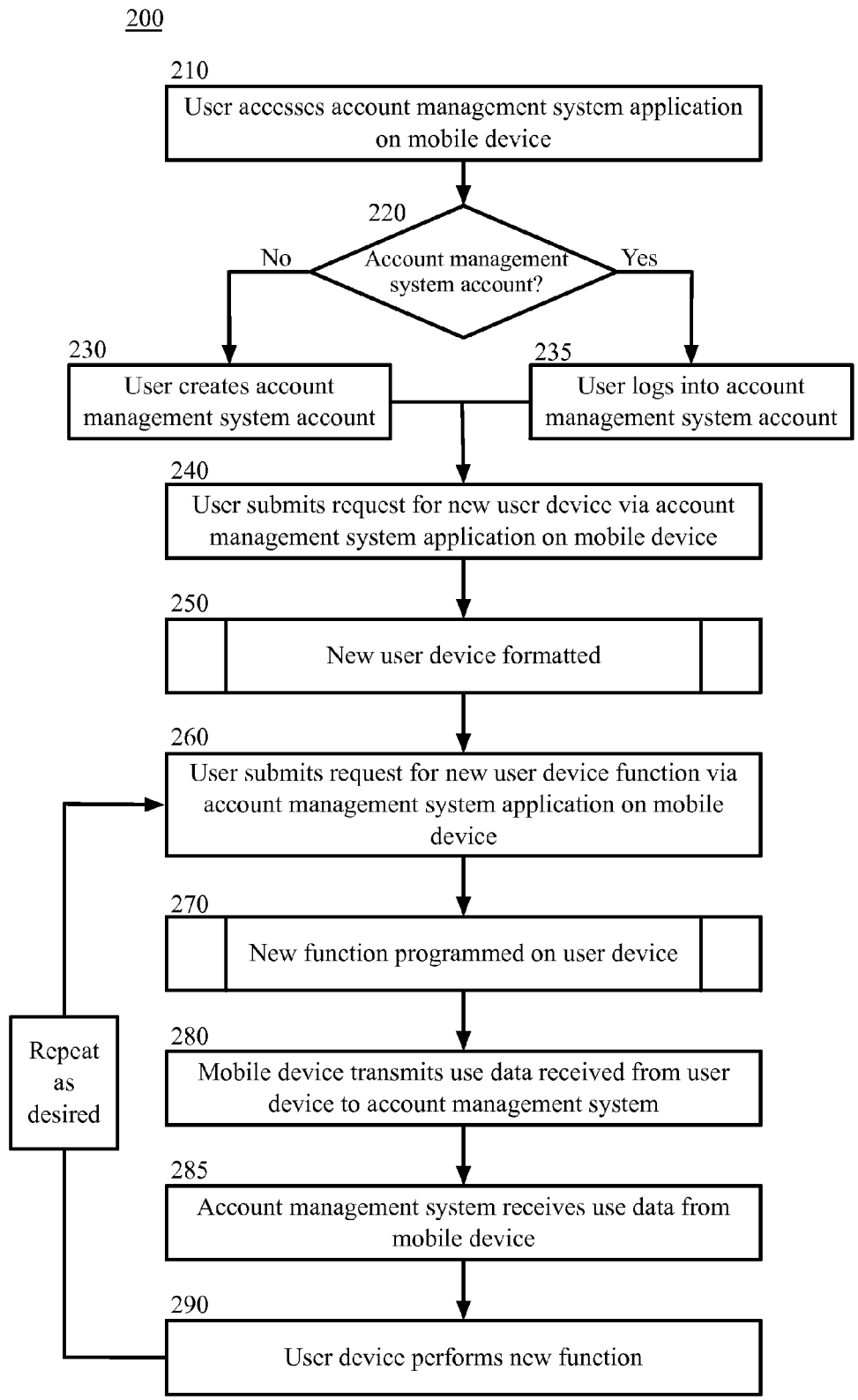
FIG. 2 is a block flow diagram depicting a method for providing a re-programmable wireless cryptographic user device, in accordance with certain example embodiments.

FIG. 2 is a block flow diagram depicting a method for providing a re-programmable wireless cryptographic user device 110, in accordance with certain example embodiments. The method 200 is described with reference to the components illustrated in FIG. 1.

In block 210, a user accesses an account management system 130 application 125 on a mobile device 120. In an example embodiment, the user downloads or otherwise enables the account management system 130 application 125 on the mobile device 120 to perform the functions described herein. In an example embodiment, the user accesses the application 125 by opening or enabling the application 125.

In block 220, the account management system 130 receives notification that the user accessed and/or enabled the application 125 on the mobile device 120 and determines whether the user has an account management system 130 account. In an example embodiment, the user is prompted to long into or create an account management system 130 account when the application is enabled. In another example embodiment, the user previously logged into the account management system 130 account and is otherwise automatically logged into the account. In yet another example embodiment, the user's login credentials are shared across other accounts (for example, social networking websites and mobile device 120 accounts) and the user is automatically logged into the account management system 130 account using the shared login credentials.

If the user does not have an account management system 130 account, the method 200 proceeds to block 230 and the user is prompted to create an account management system 130 account. In an example, the user is prompted to register with the account management system 130 when the user accesses the application 125. In another example embodiment, the user is prompted to register with the account management system 130 when the user downloads or enables an application 125. In yet another example embodiment, the user is not required to log in or register for the account management system 130 account. In this embodiment, the methods described herein are performed for a "guest" user.

In an example embodiment, the account management system 130 account is a digital wallet account maintained by the account management system 130 or a third party system. In another example embodiment, the user may use a smart phone application 125 to register with the account management system 130. In yet another example embodiment, the user accesses the account management system 130 via a smart phone application 125.

From block 230, the method 200 proceeds to block 240 in FIG. 2.

Returning to block 220 in FIG. 2, if the user has an account management system 130 account, the user logs into the account in block 235. In an example embodiment, the user's account management system 130 account information is saved in the mobile device 120 and the user is automatically signed into the user's account management system 130 account. In another example embodiment, the user is automatically logged into the account management system 130 account using shared login credentials. In yet another example embodiment, the user was previously logged into the account management system 130 account and is not required to login.

In block 240, the user submits a request for a new a re-programmable wireless cryptographic user device 110 via the account management system 130 application 125 on the mobile device 120. In an example embodiment, the user is prompted to login or create an account management system 130 account when submitting a request for a new user device 110. In an example embodiment, the user requests an initial function and/or functions to be performed by the device 110 and a user device 110 type or design when requesting the new user device 120. For example, the user can request that the user device 110 is a bracelet that is capable of maintaining patient records or a fob tag that is capable of acting as a door access card.

In block 250, the new user device 110 is formatted. The method for formatting a new re-programmable wireless cryptographic user device 110 is described in more detail hereinafter with reference to the methods described in FIG. 3.

Figure 3:
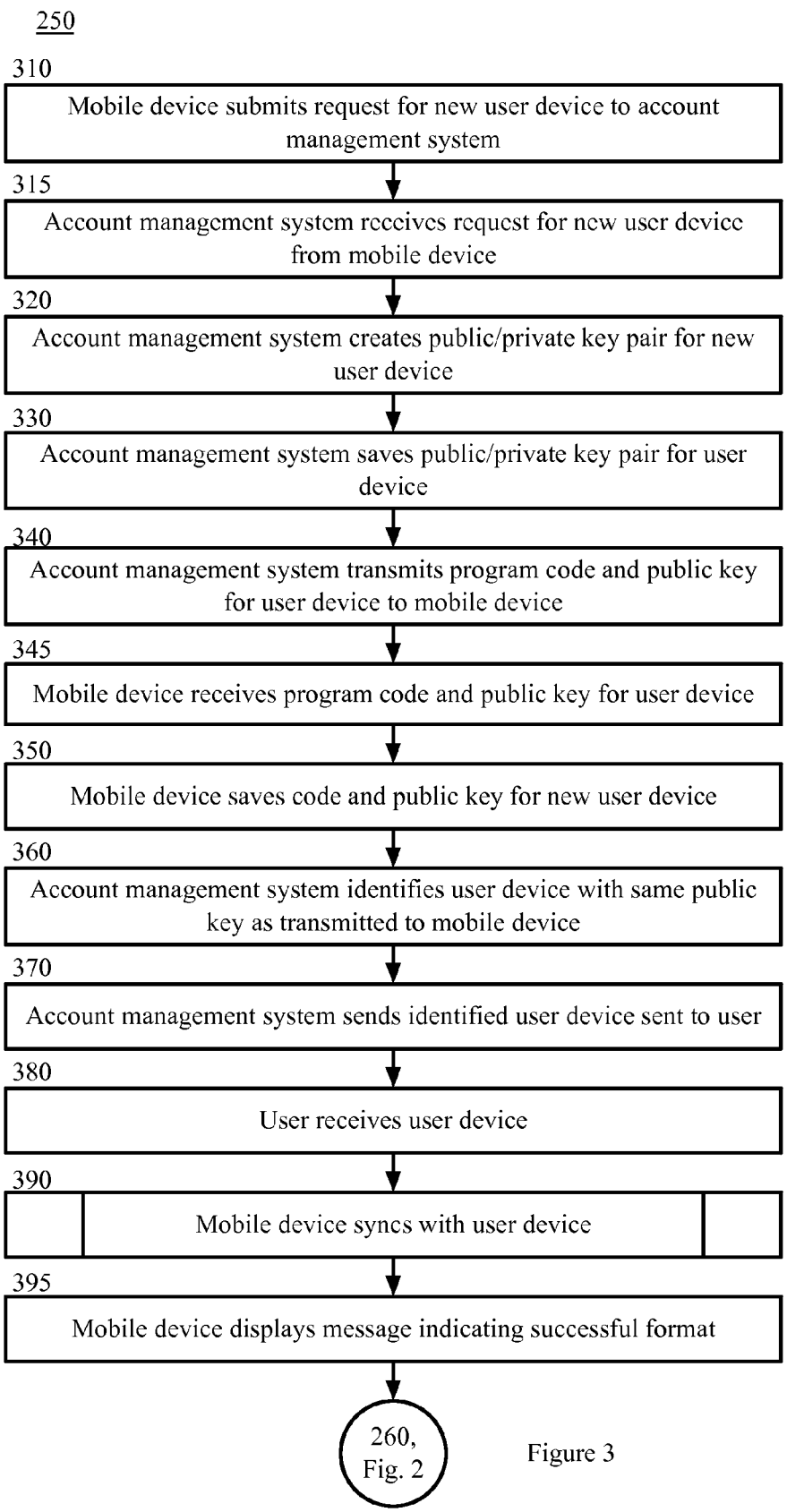
FIG. 3 is a block flow diagram depicting a method for formatting a new re-programmable wireless cryptographic user device, in accordance with certain example embodiments.

FIG. 3 is a block flow diagram depicting a method 250 for formatting a new re-programmable wireless cryptographic user device 110, in accordance with certain example embodiments, as referenced in block 250. The method 250 is described with reference to the components illustrated in FIG. 1.

In block 310, the mobile device 120 submits the request for the new user device 110 to the account management system 130. In an example embodiment, the account management system 130 application on the mobile device 120 directs the mobile device 120 to communicate with the account management system 130 and transmit the request for the new user device 110 to the account management system 130. In an example embodiment, the mobile device 120 transmits an account identifier that corresponds to the user's account management system 130 account when submitting the request for the new user device 110.

In an alternative example embodiment, the mobile device 120 stores the request for the new user device 110 until the mobile device 120 is capable of communicating with the account management system 130.

In block 315, the account management system 130 receives the request for a new user device 110 from the mobile device. In an example embodiment, the account management module 133 receives the request. In an example embodiment, the account management system 130 identifies the user account that corresponds to the account identifier transmitted with the request for a new user device 110.

In block 320, the account management system 130 creates a public/private key pair for the new user device 110. In an example embodiment, the public key is understandable by the mobile device 120 and is used by the device 120 to identify the user device 110 when the devices (including devices 110 and 120) are synced. In this embodiment, each user device 110 has a unique or different public key or device 110 identification understandable by the mobile device 110 that is used to request the user device 110 and the account management system 130. In an example embodiment, the public key is a use device 110 identifier or account management system 130 account identifier. In another example embodiment, the mobile device 120 does not identify or authenticate the user device 110. In an example embodiment, the private key is maintained by the account management system 130 and is not understandable by the mobile device 120. In an example embodiment, the mobile device 120 does not have access to the private key. In this embodiment, the private key is required to read or otherwise understand the program code transmitted by the account management system 130. In this embodiment, the mobile device 120 functions as a pass-through conduit for the information, storing the information until the user device 110 syncs with the mobile device 120. In an example embodiment, the private key and public key pair are known to the user device 110 and the account management system 130.

In block 330, the account management system 130 saves the public and private keys for the user device 110. In an example embodiment, the public and private keys are saved in the user's account management system 130 account.

In block 340, the account management system 130 retrieves program code for the user device 110 and transmits the information to the mobile device 120. In an example embodiment, the program code is required to activate and enable the user device 110. In another example embodiment, the program code comprises code to enable one or more initial functions of the user device 110. In this embodiment, the one or more initial functions correspond to the functions requested by the user when requesting the new user device 110. In an example embodiment, the program code is retrieved from the data storage unit 137. In an example embodiment, the program code comprises the user device 110 identifier or key.

In block 345, the mobile device 120 receives the program code and device 110 identifier for the new user device 110. In an example embodiment, the account management system 130 application 125 receives the program code and device 110 identification from the account management system 130.

In block 350, the mobile device 120 saves the program code and device 110 identifier for the new user device 110. In an example embodiment, the information is saved by the application 125 in the data storage unit 127 until the user device 110 is synced with the mobile device 120.

In block 360, the account management system 130 identifies the user device 110 that comprises the same device 110 identifier that was transmitted to the mobile device 120. In an example embodiment, the account management system 130 saved or otherwise formatted the user device 110 with the device 110 identifier that corresponds to the device 110 identifier that was transmitted to the mobile device 120. In another example embodiment, the account management system 130 transmits the formatting information and device 110 identifier to the mobile device 120 after identifying and/or transmitting the new user device 110 to the user.

In block 370, the account management system 130 sends the identified user device 110 to the user. In an example embodiment, the new user device 110 is mailed to the user. In another example embodiment, the new user device 110 is purchased or otherwise selected at a retail location or account management system 130 location.

In block 380, the user receives the new user device 110. In an example embodiment, the user receives the user device 110 that comprises the same device 110 identifier that was transmitted to the mobile device 120.

In block 390, the mobile device 120 syncs with the new user device 110. The method for synching the new re-programmable wireless cryptographic user device 110 with the mobile device 120 is described in more detail hereinafter with reference to the methods described in FIG. 4.

FIG. 4 is a block flow diagram depicting a method 390 for a new re-programmable wireless cryptographic user device 110 with a mobile device 120, in accordance with certain example embodiments, as referenced in block 390. The method 390 is described with reference to the components illustrated in FIG. 1.

In block 410, the user accesses the account management system 130 application 125 on the mobile device 120. In an example embodiment, the user has received the new user device 110 and desires to enable or otherwise format the device 110 by syncing it with the mobile device 120. In this embodiment, the user accesses the application 125 on the mobile device 120 to enable the transfer of the program code received from the account management system 130.

In block 420, the user device 110 is moved within a predefined proximity of the mobile device 120. In an example embodiment, the user device 110 is "tapped" or otherwise moved to a position where the mobile device 120 and the user device 110 can establish a secure communication channel 140 (for example, a near field communication, Bluetooth, Wi-Fi, or other proximity-based communication channel 140). In another example embodiment, the user device 110 is plugged into or otherwise associated with the mobile device 120.

In block 430, the mobile device 120 and the user device 110 establish a communication channel 140. In an example embodiment, the communication channel 140 is a secure communication channel 140 that enables the devices (including device 110 and 120) to transfer and/or share information. In an example embodiment, the devices (including devices 110 and 120) share identifying information to allow the devices (including devices 110 and 120) to identify and/or authenticate one another. In an example embodiment, the secure communication channel 140 further functions as a power source for the user device 110.

In block 440, the user device 110 is authenticated. In an example embodiment, the user device 110 is authenticated by the mobile device 120 transmitting the program code. In another example embodiment, the user device 110 is not authenticated by the mobile device 120. In this embodiment, the mobile device 120 transmits the program code without authenticating the user device 110. The method for authenticating the re-programmable wireless cryptographic user device 110 is described in more detail hereinafter with reference to the methods described in FIG. 5.

Figure 5:
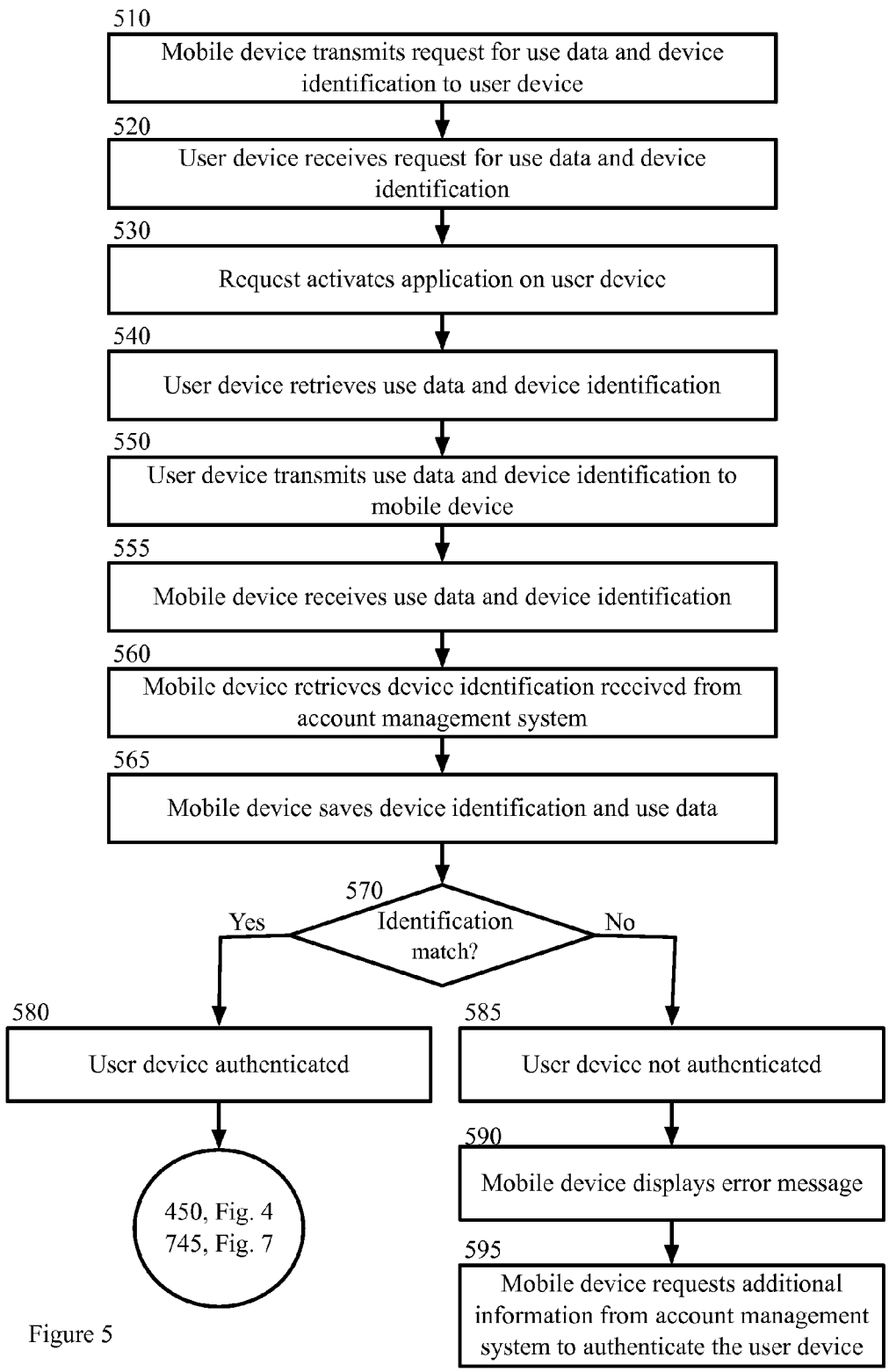
FIG. 5 is a block flow diagram depicting a method for authenticating a re-programmable wireless cryptographic user device, in accordance with certain example embodiments.

FIG. 5 is a block flow diagram depicting a method 440 for authenticating a re-programmable wireless cryptographic user device 110, in accordance with certain example embodiments, as referenced in block 440. The method 440 is described with reference to the components illustrated in FIG. 1.

In block 510, the mobile device 120 transmits a request for an identification of the user device 110 to the user device 110. In an example embodiment, the mobile device 120 transmits a request to user device 110 for identifying information to authenticate the device 110. In an example embodiment, the mobile device 120 transmits a request for use data. In this embodiment, the mobile device 120 requests the use data, but is unable to read or otherwise understand the use data. In this embodiment, the use data is only understood by the user device 110 and the account management system 130.

In block 520, the user device 110 receives the request for use data and the device 110 identifier. In an example embodiment, the request is transmitted via the secure communication channel 140.

In block 530, an application 115 on the user device 110 is activated when the request is received. In an example embodiment, the user device 110 does not comprise a user interface. In this embodiment, the user communicated with the user device 110 through the mobile device 120. In an example embodiment, the application 115 is programmed on the user device 110 before the new device 110 is sent to the user. In another example embodiment, the application 115 is programmed on the user device 110 when the device 110 is first synced with the mobile device 120.

In block 540, the user device 110 retrieves the user device 110 identification and/or use data. In an example embodiment, the information is retrieved by the application 115 from the data storage unit 117 or storage in the secure element 119 or secure memory. In another example embodiment, the application 115 is resident on the secure element 119 or secure memory. In an example embodiment, the user device 110 identification is a user device 110 key or an account management system 130 key.

In block 550, the user device 110 transmits the device 110 identifier and/or use data to the mobile device 120. In an example embodiment, the information is transmitted via the secure communication channel 140 in response to the request received from the mobile device 120.

In block 555, the mobile device 120 receives the device 110 identifier and/or the use data transmitted by the user device 110.

In block 560, the mobile device 120 retrieves the device 110 identifier previously received from the account management system 130. In an example embodiment, the device 110 identifiers are compared to authenticate the user device 110. In an example embodiment, the device 110 identifier is retrieved from the data storage unit 127.

In block 565, the mobile device 120 saves the device 110 identifier and/or use data received from the user device 110. In an example embodiment, the information is saved by the application 125 in the data storage unit 127.

In block 570, the mobile device 120 determines whether the device 110 identifier received from the user device 110 matches the device 110 identifier received from the account management system 130. In an example embodiment, the mobile device 120 compares the two device 110 identifiers to determine if they match.

If the device 110 identifiers do not match, the method 440 proceeds to block 585 in FIG. 5. In block 585, the user device 110 is not authenticated. In an example embodiment, the user device 110 is not authenticated because the device 110 identifiers do not match.

In block 590, the mobile device 120 displays an error message. In an example embodiment, the error message is displayed by the application 125 on the user interface 121. In an example embodiment, the error message is displayed as a pop-up window, alert, or other text on the mobile device 120.

In block 595, the mobile device 120 requests additional information from the account management system 130 to authenticate the user device 110. In an example embodiment, the mobile device 110 does not transfer the formatting information to the user device 110 unless the device 110 is authenticated. In an example embodiment, the mobile device 120 requests the device 110 identifier or other identifying information from the user device 110.

Returning to block 570, if the device 110 identifiers match, the method 440 proceeds to block 580 in FIG. 5.

In block 580, the user device 110 is authenticated. In an example embodiment, the user device 110 is authenticated in response to determining that the device 110 identifiers match.

The method 440 then proceeds to block 450 in FIG. 4 or block 745 in FIG. 7.

Returning to FIG. 4, in block 450, the mobile device 120 retrieves the program code. In an example embodiment, the program code is retrieved from the data storage unit 127. In an example embodiment, the program code is retrieved in response to authenticating the user device 110.

In block 460, the mobile device 120 transmits the program code to the user device 110. In an example embodiment, the mobile device 120 transmits the program code via the communication channel 140.

In block 470, the user device 110 receives the program code. In an example embodiment, the program code is received by the application 115 and/or the secure element 119.

In block 480, the user device 110 is formatted. In an example embodiment, the application 115 and/or secure element 119 writes the program code to the user device 110 to format the device 110. In an example embodiment, the user device 110 is enabled and capable of being used to perform a function encoded by the program code.

In block 490, the user device 110 transmits a successful formatting message to the mobile device 120. In an example embodiment, the message is transmitted via the secure communication channel 140.

In block 495, the mobile device 120 receives the successful formatting message. In an example embodiment, the message is received by the application 125.

The method 390 then proceeds to block 395 in FIG. 3.

Returning to FIG. 3, in block 395, the mobile device 120 displays a message indicating that the user device 110 was successfully formatted. In an example embodiment, the message comprises a pop-up window, an alert, or other text displayed on the user interface 121.

The method 250 then proceeds to block 260 in FIG. 2.

Returning to FIG. 2, in block 260, the user submits a request for a new user device 110 function via the account management system 130 application 125 on the mobile device 120. In an example embodiment, the user uses the user device to perform the function initially formatted on the user device 110 for any period of time before requesting a new and/or additional function. In an example embodiment, the user accesses the application 125 on the mobile device 120 and requests the new function.

In block 270, the new function is programmed on the user device 110. The method for adding a new function to the re-programmable wireless cryptographic user device 110 is described in more detail hereinafter with reference to the methods described in FIG. 4.

Figure 6:
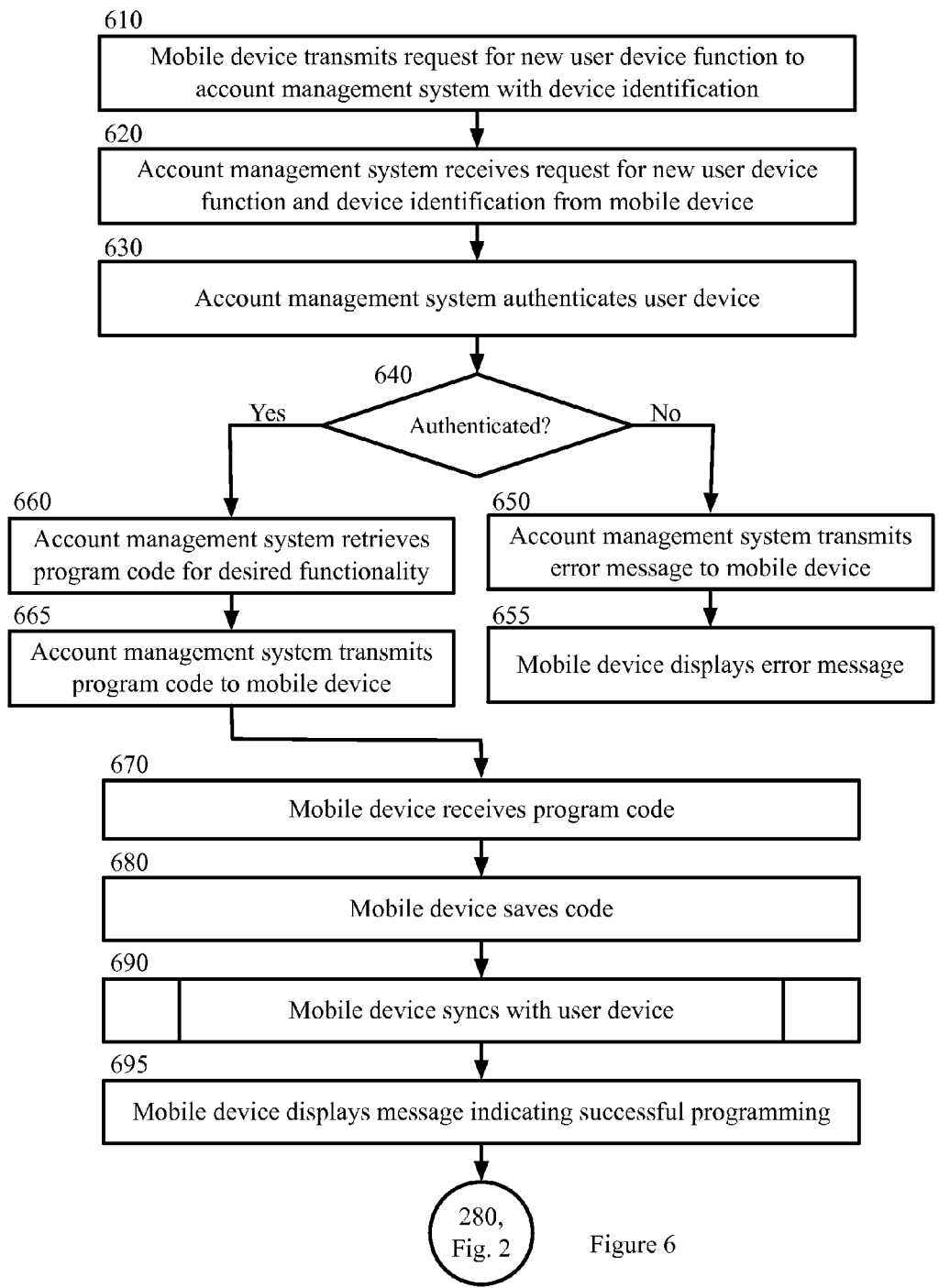
FIG. 6 is a block flow diagram depicting a method for adding a new function to a re-programmable wireless cryptographic user device, in accordance with certain example embodiments.

FIG. 6 is a block flow diagram depicting a method 270 for adding a new function to a re-programmable wireless cryptographic user device 110, in accordance with certain example embodiments, as referenced in block 2270. The method 270 is described with reference to the components illustrated in FIG. 1.

In block 610, the mobile device 120 transmits a request for the new user device 110 function to the account management system 130. In an example embodiment, the mobile device 120 transmits the user device 110 identifier and/or the account identifier for the user's account management system 130 account. In this embodiment, the user device 110 identifier and/or account identifier are known to the mobile device 120 and understandable by the account management system 130 to identify the user device 110 and/or the user's account management system 130 account. In another example embodiment, the request is signed by the user device 110 private key understandable only by the account management system 130 and the user device 110.

In block 620, the account management system 130 receives the request for the new user device 110 function from the mobile device 120. In an example embodiment, the account management system 130 receives the device 110 identifier and/or account identifier from the mobile device 120 with the request for the new user device 110 function.

In block 630, the account management system 130 authenticates the user device 110. In an example embodiment, the account management system 130 authenticates the device 110 identifier.

In block 640, the account management system 130 compares the device 110 identifier received from the mobile device 120 to the device 110 identifier or private key saved in the user's account management system 130 account. In another example embodiment, the account management system 130 determines that the user device 110 identifier is an actual user device 110 identifier that corresponds to an existing user device 110.

If the device 110 identifiers do not match, or the user device 110 is not authenticated, the method 270 proceeds to block 650 in FIG. 6.

In block 650, the account management system 130 transmits an error message to the mobile device 120. In an example embodiment, the error message indicates that the user device 110 could not be authenticated.

In block 655, the mobile device 120 receives the error message and displays it. In an example embodiment, the error message is displayed by the application 125 in a pop-up window, an alert, or other form of text notification via the user interface 121.

Returning to block 660, if the user device 110 is authenticated, the method 270 proceeds to block 660 in FIG. 6.

In block 660, the account management system 130 retrieves the program code for the desired new functionality. In an example embodiment, the account management system 130 retrieves the program code from the data storage unit 137.

In block 665, the account management system 130 transmits the program code to the mobile device 120. In an example embodiment, the account management system 130 also transmits the authenticated device 110 identifier for the user device 110.

In block 670, the mobile device 120 receives the program code from the account management system 130.

In block 680, the mobile device 120 saves the program code. In an example embodiment, the application 125 receives the program code and saves it in the data storage unit 127 until the devices (including devices 110 and 120) are synced.

In block 690, the mobile device 120 syncs with the user device 110. The method for synching the re-programmable wireless cryptographic user device 110 with the mobile device 120 to add a new function to the re-programmable wireless cryptographic user device 110 is described in more detail hereinafter with reference to the methods described in FIG. 7.

FIG. 7 is a block flow diagram depicting a method 690 for synching a re-programmable wireless cryptographic user device 110 with a mobile device 120 to add a new function to the re-programmable wireless cryptographic user device 110, in accordance with certain example embodiments, as referenced in block 690. The method 690 is described with reference to the components illustrated in FIG. 1.

In block 710, the user device 110 is moved within a predefined proximity of the mobile device 120. In an example embodiment, the user device 110 is "tapped" or otherwise moved to a position where the mobile device 120 and the user device 110 can establish a secure communication channel 140 (for example, a near field communication, Bluetooth, Wi-Fi, or other proximity-based communication channel 140). In another example embodiment, the user device 110 is plugged into or otherwise associated with the mobile device 120.

In block 720, the mobile device 120 and the user device 110 establish a communication channel 140. In an example embodiment, the communication channel 140 is a secure communication channel 140 that enables the devices (including device 110 and 120) to transfer and/or share information. In an example embodiment, the devices (including devices 110 and 120) share identifying information to allow the devices (including devices 110 and 120) to identify and/or authenticate one another.

In block 440, the user device 110 is authenticated. The method for authenticating the re-programmable wireless cryptographic user device 110 is described previously in more detail with reference to the methods described in FIG. 5.

Returning to FIG. 7, in block 745, the mobile device 120 retrieves the program code. In an example embodiment, the program code is retrieved from the data storage unit 127. In an example embodiment, the program code is retrieved in response to authenticating the user device 110.

In block 750, the mobile device 120 transmits the program code to the user device 110. In an example embodiment, the mobile device 120 transmits the program code via the communication channel 140.

In block 760, the user device 110 receives the program code. In an example embodiment, the program code is received by the application 115 and/or the secure element 119.

In block 770, the user device 110 is formatted. In an example embodiment, the application 115 and/or secure element 119 writes the program code to the user device 110 to format the device 110. In an example embodiment, the user device 110 is enabled and capable of being used to perform a function encoded by the program code.

In block 780, the user device 110 transmits a successful formatting message to the mobile device 120. In an example embodiment, the message is transmitted via the secure communication channel 140.

In block 790, the mobile device 120 receives the successful formatting message. In an example embodiment, the message is received by the application 125.

The method 690 then proceeds to block 695 in FIG. 6.

Returning to FIG. 6, in block 695, the mobile device 120 displays a message indicating successful programming of the user device 110. In an example embodiment, the message is displayed as a pop-up window, alert, or other form of text on the user interface 121.

The method 270 then proceeds to block 280 in FIG. 2.

Returning to FIG. 2, in block 280, the mobile device 120 transmits the use data received from the user device 110 to the account management system 130. In an example embodiment, the use data is transmitted when a new user device 110 function is requested or at any time thereafter. In an example embodiment, the use data is transmitted with the device 110 identifier and/or account identifier.

In block 285, the account management system 130 receives the use data from the mobile device 120. In an example embodiment, the use data is saved in the data storage unit 137 and/or the user's account management system 130 account. In an example embodiment, the use data is analyzed and available to be viewed the by user.

In block 290, the user device 110 performs the new function. In an example embodiment, the user device 110 performs the new function and any previously-requested functions. In this embodiment, the user device 110 is capable of performing multiple functions.

The methods described in block 260 through 290 are repeated as desired to obtain new user device 110 functions.

Other Example Embodiments

Figure 8:
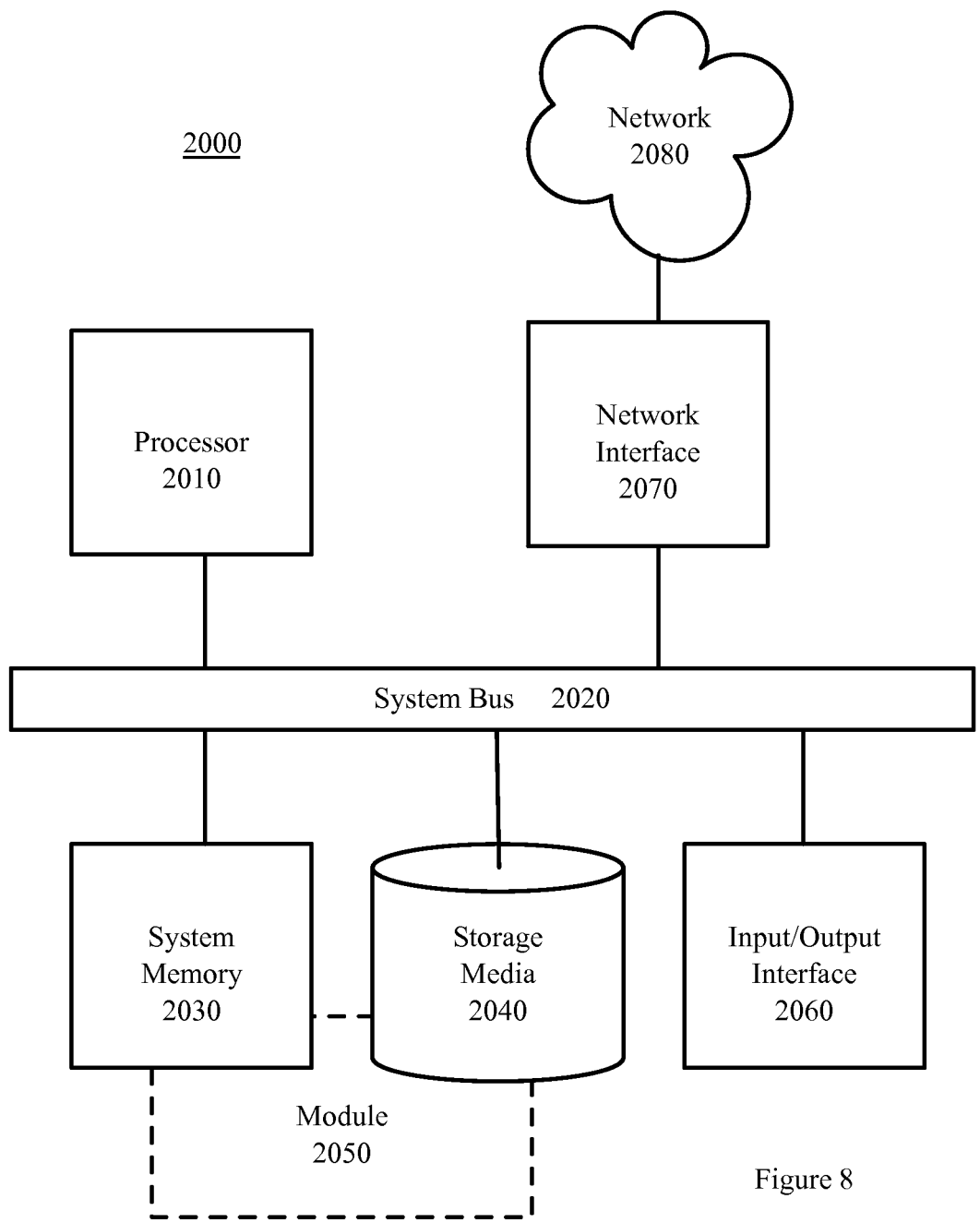
FIG. 8 is a block diagram depicting a computer machine and module, in accordance with certain example embodiments.

FIG. 8 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory (ROM), programmable read-only memory (PROM), erasable programmable read-only memory (EPROM), flash memory, or any other device capable of storing program instructions or data with or without applied power. The system memory 2030 may also include volatile memories such as random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip (SOC), system on package (SOP), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the invention claimed herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to provide re-programmable wireless cryptographic devices, comprising:
    receiving, by one or more computing devices, a first input indicating that a user has accessed an account management system service on the one or more computing devices, the first input comprising a request for a first functionality for a cryptographic device, the cryptographic device configured to be re-programmed through different program code to perform one or more functionalities different than the first functionality;
    transmitting, by the one or more computing devices, the first input to the account management system, wherein the cryptographic device is unable to directly communicate with the account management system;
    receiving, by the one or more computing devices and from the account management system, a response to the first input comprising program code encoding the first functionality requested for the cryptographic device;
    detecting, by the one or more computing devices, that the cryptographic device is within a predefined proximity of the one or more computing devices;
    establishing, between the one or more computing devices and the cryptographic device, a wireless communication channel;
    transmitting, by the one or more computing devices and through the wireless communication channel while the cryptographic device is within the predefined proximity of the one or more computing devices, the program code encoding the first functionality to the cryptographic device; and
    receiving, by the one or more computing devices, a message from the cryptographic device indicating a successful programming of the cryptographic device with the first functionality, wherein the program code encoding the first functionality was written to a secure memory resident on the cryptographic device, and wherein the one or more computing devices are unable to execute the program code encoding the first functionality without a private key.

2. The method of claim 1, wherein the one or more computing devices communicates with the account management system via an Internet connection or a cellular communication connection.

3. The method of claim 1, wherein the wireless communication channel comprises a near field communication channel or a Bluetooth communication channel.

4. The method of claim 1, further comprising executing, by the cryptographic device, the program code encoding the first functionality.

5. The method of claim 1, further comprising:
    receiving, by the one or more computing devices, a second input indicating that the user has accessed the account management system service on the one or more computing devices, the second input comprising a request for a second functionality for the cryptographic device;

transmitting, by the one or more computing devices, the second input to the account management system; and receiving, by the one or more computing devices and from the account management system, a response to the second input comprising program code encoding the second functionality requested for the cryptographic device.

6. The method of claim 5, further comprising:

transmitting, by the one or more computing devices and through a second wireless communication channel while the cryptographic device is within the predefined proximity of the one or more computing devices, the second program code encoding the second functionality to the cryptographic device; and receiving, by the one or more computing devices, a second message indicating a successful second programming of the cryptographic device with the second functionality, wherein the second program code encoding the second functionality was written to the secure memory resident on the cryptographic device, and wherein the first functionality remains written to the secure memory.

7. The method of claim 6, further comprising executing, by the cryptographic device, the second program code encoding the second functionality.

8. A computer program product, comprising:

a non-transitory computer-readable medium having computer-readable program instructions embodied therein that when executed by a computer cause the computer to provide re-programmable wireless cryptographic devices, the computer-readable program instructions comprising:

computer-readable program instructions to receive a first input indicating that a user has accessed an account management system service on one or more computing devices, the first input comprising a request for a first functionality for a cryptographic device, the cryptographic device is configured to be being re-programmed through different program code to perform one or more different functionalities other than the first functionality;

computer-readable program instructions to transmit the first input to the account management system, wherein the cryptographic device is unable to directly communicate with the account management system;

computer-readable program instructions to receive, from the account management system, a response to the first input comprising program code encoding the first functionality requested for the cryptographic device;

computer-readable program instructions to detect that the cryptographic device is within a predefined proximity of the one or more computing devices;

computer-readable program instructions to establishing, with the cryptographic device, a wireless communication channel;

computer-readable program instructions to transmit the program code encoding the first functionality from the one or more computing devices to the cryptographic device; and computer-readable program instructions to receive a message from the cryptographic device indicating a successful programming of the cryptographic device with the first functionality, wherein the program code encoding the first functionality was written to a secure memory resident on the cryptographic device, and wherein the one or more computing devices are unable to execute the program code encoding the first functionality without a private key.

9. The computer program product of claim 8, wherein the one or more computing devices communicates with the account management system via an Internet connection or a cellular communication connection.

10. The computer program product of claim 8, further comprising:

computer-readable program instructions to detect that the cryptographic device is within a predefined proximity of the one or more computing devices; and computer-readable program instructions to establish between the one or more computing devices and the cryptographic device, a wireless communication channel.

11. The computer program product of claim 8, further comprising:

computer-readable program instructions to receive a second input indicating that the user has accessed the account management system service on the one or more computing devices, the second input comprising a request for a second functionality for the cryptographic device;

computer-readable program instructions to transmit the second input to the account management system and from the one or more computing devices; and computer-readable program instructions to receive, from the account management system, a response to the second input comprising program code encoding the second functionality requested for the cryptographic device.

12. A system to provide re-programmable wireless cryptographic devices, comprising:

a non-transitory storage medium; and a processor communicatively coupled to the storage medium, wherein the processor executes application code instructions that are stored in the storage medium to cause the system to:

receive a first input indicating that a user has accessed an account management system service on one or more computing devices, the first input comprising a request for a first functionality for a cryptographic device, the cryptographic device is configured to be being re-programmed through different program code to perform one or more functionalities different than the first functionality;

transmit the first input the one or more computing devices and to the account management system, wherein the cryptographic device is unable to directly communicate with the account management system;

receive, from the account management system, a response to the first input comprising program code encoding the first functionality requested for the cryptographic device;

detect that the cryptographic device is within a predefined proximity of the one or more computing devices; and establish, with the cryptographic device, a wireless communication channel;

transmit the program code encoding the first functionality from the one or more computing devices and to the cryptographic device receive a message from the cryptographic device indicating a successful programming of the cryptographic device with the first functionality, wherein the program code encoding the first functionality was written to a secure memory resident on the cryptographic device;

wherein the one or more computing devices are unable to execute the program code encoding the first functionality without a private key.

13. The system of claim 12, wherein the one or more computing devices communicates with the account management system via an Internet connection or a cellular communication connection.

14. The system of claim 12, wherein the processor is further configured to execute computer-executable instructions stored in the storage medium to cause the system to:
    detect that the cryptographic device is within a predefined proximity of the one or more computing devices; and
    establish between the one or more computing devices and the cryptographic device, a wireless communication channel.

15. The system of claim 12, wherein the processor is further configured to execute computer-executable instructions stored in the storage medium to cause the system to receive a message from the cryptographic device indicating a successful programming of the cryptographic device with the first functionality, wherein the program code encoding the first functionality was written to a secure memory resident on the cryptographic device.

16. The system of claim 12, wherein the processor is further configured to execute computer-executable instructions stored in the storage medium to cause the system to:
    receive a second input indicating that the user has accessed the account management system service on the one or more computing devices, the second input comprising a request for a second functionality for the cryptographic device;
    transmit the second input to the account management system and from the one or more computing devices; and
    receive, from the account management system, a response to the second input comprising program code encoding the second functionality requested for the cryptographic device.

17. The system of claim 16, wherein the processor is further configured to execute computer-executable instructions stored in the storage medium to cause the system to receive a message from the cryptographic device indicating a successful programming of the cryptographic device with the second functionality, wherein the program code encoding the second functionality was written to a secure memory resident on the cryptographic device.

18. The computer program product of claim 11, wherein the the computer-readable program instructions further comprise:
    computer-readable program instructions to transmit, through a second wireless communication channel while the cryptographic device is within the predefined proximity of the one or more computing devices, the second program code encoding the second functionality to the cryptographic device; and
    computer-readable program instructions to receive a second message indicating a successful second programming of the cryptographic device with the second functionality, wherein the second program code encoding the second functionality was written to the secure memory resident on the cryptographic device, and wherein the first functionality remains written to the secure memory.

19. The computer program product of claim 11, wherein the computer-readable program instructions further comprise further comprising computer-readable program instructions to execute, by the cryptographic device, the second program code encoding the second functionality.

20. The computer program product of claim 8, wherein the wireless communication channel comprises a near field communication channel or a Bluetooth communication channel.

* * * * *